United States Patent
Washington et al.

(10) Patent No.: US 12,533,990 B2
(45) Date of Patent: Jan. 27, 2026

(54) BATTERY CAPACITY ESTIMATION AND CONTROL

(71) Applicant: FORD GLOBAL TECHNOLOGIES, LLC, Dearborn, MI (US)

(72) Inventors: Donnell Washington, Northville, MI (US); Michael David Beeney, Canton, MI (US); Gabrielle Vuylsteke, Ferndale, MI (US); Thomas Coupar, Ann Arbor, MI (US); Jennifer Miller, Royal Oak, MI (US); Arsham Shahlari, McKinney, TX (US); Timothy Kirby, Detroit, MI (US); Yonghua Li, Ann Arbor, MI (US); Michael Dennis, Portland, OR (US); Andrea Cordoba Arenas, Ann Arbor, MI (US); Patterson Kaduvinal Abraham, Dearborn, MI (US); Bowen Zhang, Farmington Hills, MI (US); Matthew Tomai, Troy, MI (US); Laurie Ann Ramroth, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 18/630,575

(22) Filed: Apr. 9, 2024

(65) Prior Publication Data

US 2025/0313124 A1  Oct. 9, 2025

(51) Int. Cl.
*B60L 58/16* (2019.01)
*B60L 58/14* (2019.01)
*G01R 31/382* (2019.01)

(52) U.S. Cl.
CPC .............. *B60L 58/16* (2019.02); *B60L 58/14* (2019.02); *G01R 31/382* (2019.01)

(58) Field of Classification Search
CPC ........ B60L 58/16; B60L 58/14; G01R 31/382
(Continued)

(56) References Cited

U.S. PATENT DOCUMENTS 6,107,779 A * 8/2000 Hara .................. G01R 31/3832
                                                         320/132
6,323,620 B1 * 11/2001 Miyoshi .................... H02J 7/34
                                                         320/118
(Continued)

FOREIGN PATENT DOCUMENTS

CN   107179509 A  *  9/2017  ............ H01M 10/44
CN   115515815 A  * 12/2022  ................ B60P 3/22
(Continued)

OTHER PUBLICATIONS

English Translation of CN107179509 + original document, accessed Sep. 2025 (Year: 2025).*

(Continued)

*Primary Examiner* — Krishnan Ramesh
(74) *Attorney, Agent, or Firm* — David B. Kelley; Brooks Kushman P.C.

(57) ABSTRACT

An automotive power system alters a maximum discharge power of a traction battery according to an estimated capacity of the traction battery that depends on a weight parameter having a value that changes according to a charge experienced by the traction battery during periods when a switch connects the traction battery with an electric machine.

17 Claims, 2 Drawing Sheets

(58) Field of Classification Search
USPC .......................................................... 701/22
See application file for complete search history.

(56) References Cited

U.S. PATENT DOCUMENTS

| | | | | |
|---|---|---|---|---|
| 8,116,924 | B2* | 2/2012 | Wakashiro | ............ B60W 10/06 |
| | | | | 180/65.21 |
| 8,890,484 | B2 | 11/2014 | Mao et al. | |
| 9,187,007 | B2 | 11/2015 | Li et al. | |
| 10,436,848 | B2 | 10/2019 | Li et al. | |
| 10,727,678 | B2* | 7/2020 | Zou | ......................... B60L 53/66 |
| 11,001,154 | B2* | 5/2021 | Hita | ....................... B60W 20/13 |
| 11,054,476 | B2 | 7/2021 | Gass et al. | |
| 11,535,117 | B2* | 12/2022 | Li | .......................... G06Q 10/20 |
| 11,697,355 | B2* | 7/2023 | Haputhanthri | ....... G01R 31/006 |
| | | | | 320/150 |
| 12,005,807 | B2* | 6/2024 | Qiao | ................. H01M 10/4257 |
| 2007/0254776 | A1* | 11/2007 | Wakashiro | ............ B60W 20/00 |
| | | | | 477/181 |
| 2019/0009682 | A1* | 1/2019 | Zou | ......................... B60L 53/62 |
| 2019/0211528 | A1* | 7/2019 | Hita | .................... H01M 10/443 |
| 2019/0329668 | A1* | 10/2019 | Li | ............................ B60L 58/18 |
| 2020/0062124 | A1* | 2/2020 | Haputhanthri | ....... G01R 31/006 |
| 2021/0152005 | A1* | 5/2021 | Xu | ........................ H02J 7/00712 |
| 2021/0197690 | A1* | 7/2021 | Qiao | ........................ B60L 58/13 |
| 2021/0215768 | A1* | 7/2021 | Zhang | ................. G01R 31/3842 |
| 2022/0185116 | A1* | 6/2022 | Oguma | .................... B60L 50/60 |
| 2025/0184920 | A1* | 6/2025 | Liberg | ................... H02J 7/0048 |

FOREIGN PATENT DOCUMENTS

| | | | | |
|---|---|---|---|---|
| CN | 117686909 A | * | 3/2024 | ........... G01R 31/378 |
| WO | WO-2019037595 A1 | * | 2/2019 | ............ H01M 10/48 |

OTHER PUBLICATIONS

English Translation of CN115515815+ original document, accessed Sep. 2025 (Year: 2025).*

English Translation of CN117686909 + original document, accessed Sep. 2025 (Year: 2025).*

* cited by examiner

BATTERY CAPACITY ESTIMATION AND CONTROL

TECHNICAL FIELD

The present disclosure relates to a method and system for estimating a traction battery capacity for an electric vehicle (EV). More specifically, the present disclosure relates to a method and system for estimating a traction battery capacity for an EV based on an adaptive low-pass filter.

BACKGROUND

Electric vehicles rely on a traction battery for supplying electric power to an electric machine for propulsion. Over time, the capacity of the traction battery may decrease. An on-board vehicle computer may be configured to update the battery capacity.

SUMMARY

A vehicle includes a traction battery, an electric machine, and a controller that alters a maximum discharge power of the traction battery according to an estimated capacity of the traction battery that depends on a previous instantaneous capacity value of the traction battery, a current instantaneous capacity value of the traction battery, and a weight parameter having a value that changes according to a charge experienced by the traction battery and a state of charge of the traction battery.

A method includes altering a maximum discharge power of a traction battery according to an estimated capacity of the traction battery that depends on a weight parameter having a value that changes according to a charge experienced by the traction battery during periods when a switch connects the traction battery with an electric machine.

An automotive power system includes a controller that alters a maximum discharge power of a traction battery according to an estimated capacity of the traction battery that depends on a weight parameter having a value that changes according to a charge experienced by the traction battery during periods when a switch connects the traction battery with an electric machine.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure, among other things, relates to a method and system for estimating a traction battery capacity for an EV. More specifically, the present disclosure relates to a method and system for determining an appropriate weight for factors of an adaptive low-pass filter configured to estimate the battery capacity.

Figure 1:
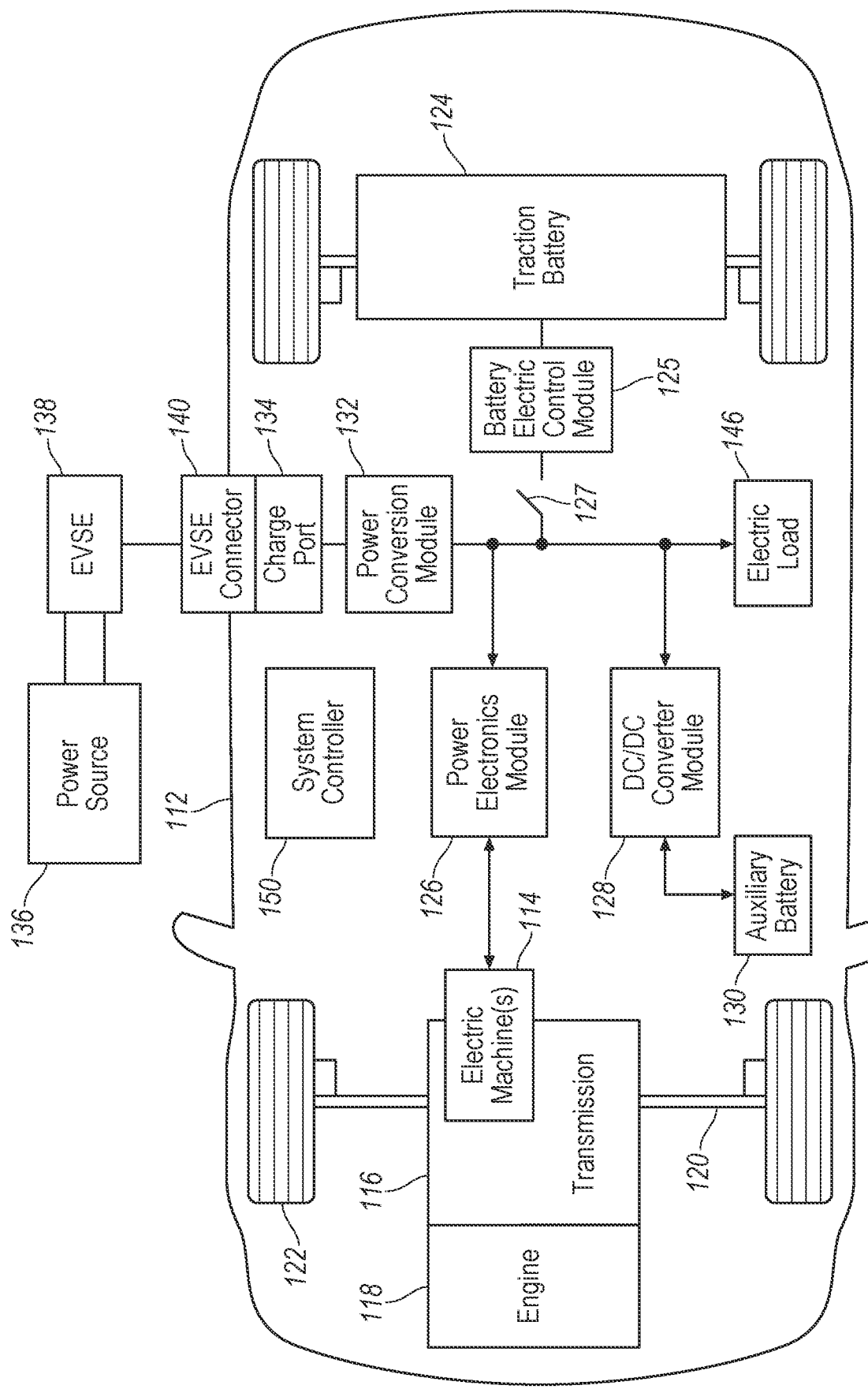
FIG. 1 illustrates an example block topology of an electrified vehicle illustrating drivetrain and energy storage components.

FIG. 1 illustrates a plug-in hybrid-electric vehicle (PHEV). A plug-in hybrid-electric vehicle 112 may comprise one or more electric machines (electric motors) 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 may provide propulsion and slowing capability when the engine 118 is turned on or off. The electric machines 114 may also act as generators and may provide fuel economy benefits by recovering energy that would be lost as heat in the friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 stores energy that may be used by the electric machines 114. A vehicle battery pack 124 may provide a high voltage DC output. The traction battery 124 may be electrically coupled to one or more battery electric control modules (BECM) 125. The BECM 125 may be provided with one or more processors and software applications configured to monitor and control various operations of the traction battery 124. The traction battery 124 may be further electrically coupled to one or more power electronics modules 126. The power electronics module 126 may also be referred to as a power inverter. One or more contactors 127 may isolate the traction battery 124 and the BECM 125 from other components when opened and couple the traction battery 124 and the BECM 125 to other components when closed. The power electronics module 126 may also be electrically coupled to the electric machines 114 and provide the ability to bi-directionally transfer energy between the traction battery 124 and the electric machines 114. For example, a traction battery 124 may provide a DC voltage while the electric machines 114 may operate using a three-phase AC current. The power electronics module 126 may convert the DC voltage to a three-phase AC current for use by the electric machines 114. In a regenerative mode, the power electronics module 126 may convert the three-phase AC current from the electric machines 114 acting as generators to the DC voltage compatible with the traction battery 124. The description herein is equally applicable to a pure electric vehicle. For a pure electric vehicle, the hybrid transmission 116 may be a gear box connected to the electric machine 114 and the engine 118 may not be present.

In addition to providing energy for propulsion, the traction battery 124 may provide energy for other vehicle electrical systems. A vehicle may include a DC/DC converter module 128 that converts the high voltage DC output of the traction battery 124 to a low voltage DC supply that is compatible with other low-voltage vehicle loads. An output of the DC/DC converter module 128 may be electrically coupled to an auxiliary battery 130 (e.g., 12V battery).

The vehicle 112 may be a battery electric vehicle (BEV) or a plug-in hybrid electric vehicle (PHEV) in which the traction battery 124 may be recharged by an external power source 136. The external power source 136 may be a connection to an electrical outlet. The external power source 136 may be an electrical power distribution network or grid as provided by an electric utility company. The external power source 136 may be electrically coupled to electric vehicle supply equipment (EVSE) 138. The EVSE 138 may provide circuitry and controls to manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled may transfer power using a wireless inductive coupling.

One or more electrical loads 146 may be coupled to the high-voltage bus. The electrical loads 146 may have an associated controller that operates and controls the electrical loads 146 when appropriate. Examples of electrical loads 146 may be a heating module, an air-conditioning module, or the like.

The various components discussed may have one or more associated controllers to control and monitor the operation of the components. The controllers may communicate via a serial bus (e.g., Controller Area Network (CAN)) or via discrete conductors. A system controller 150 may be present to coordinate the operation of the various components. It is noted that the system controller 150 is used as a general term and may include one or more controller devices configured to perform various operations in the present disclosure. For instance, the system controller 150 may be programmed to enable a powertrain control function to operate the powertrain of the vehicle 112. The system controller 150 may be further programmed to enable a telecommunication function with various entities (e.g., a server) via a wireless network (e.g., a cellular network).

The BECM 125 may be configured to perform various operations. For instance, the BECM 125 may be configured to perform the capacity estimation for the traction battery 124 in a periodic manner. As discussed above, the total capacity of the traction battery 124 may reduce over time. Thus after a period of time, the true capacity $Q_{True}$ (actual capacity, or updated capacity) of the traction battery 124 may be less than the designed capacity when the traction battery 124 is manufactured. An accurate determination of the actual capacity may facilitate the operations and controls of the vehicle 112. For instance, an accurate estimation of the actual capacity may provide the vehicle user with better range estimation, and affect the charging and discharging operations.

There are a variety of methods to determine the actual capacity of the traction battery 124. For instance, the BECM 125 may be configured to determine the actual capacity of the traction battery 124 using an adaptive low-pass filter which assigns a percentage weight to the newly calculated instantaneous capacity $Q_{New}$. For instance, the adaptive low-pass filter may assign a first weight W to a previously determined capacity $Q_{Old}$ (previous capacity, or old capacity), and a second weight 1−W to the newly calculated instantaneous capacity $Q_{New}$ (new capacity). In general, the first weight W may be greater than the second weight. The true capacity of the traction battery 124 may be calculated using the equation below:

$$Q_{True} = W \cdot Q_{old} + (1-W) \cdot Q_{New} \qquad (1)$$

Conventionally, a fixed weight may be applied to the low-pass filter. The first weight W may be 90% and the second weight 1−W may be 10%. The rationale to assign a lower weight to the newly calculated instantaneous capacity is that battery decay is a slow process in general, and it may be assumed that the true capacity of the traction battery does not vary significantly over a short period of time (e.g., a month). Therefore, an average of recent values may be a reasonably accurate estimate of the present capacity and may limit the impact of random variation from estimate to estimate.

Instead of using the fixed weight, the present disclosure proposes a method using an adaptive weight W for the low-pass filter. More specifically, the present disclosure proposes a method for determining the weight W of the adaptive low-pass filter using the sample size N. The low pass filter represented by the above equation (1) may be treated as an estimate for a moving average which estimates the true capacity $Q_{True}$ of the traction battery 124 by determining an average of a number of previously determined capacities $Q_{Old}$ and the newly determined capacity $Q_{New}$. In this case, the weight W may be presented as equal to (N−1)/N and the (1−W) may be presented as equal to 1/N using the following equations:

$$W = \frac{N-1}{N} \qquad (2)$$

$$1 - W = \frac{1}{N} \qquad (3)$$

wherein N represents the sample size of the low-pass filter. Therefore, the above equation (1) may be further developed into:

$$Q_{True} = \frac{N-1}{N} \cdot Q_{old} + \frac{1}{N} \cdot Q_{New} \qquad (4)$$

To determine the sample size N, it is assumed that battery decay is a slow process in general and the true capacity of the traction battery does not vary significantly over a short period of time in the present disclosure. Therefore, the true instantaneous capacity $Q_{True}$ of the traction battery may be approximately equal to the average capacity $Q_{Avg}$ that is predetermined (e.g., via prior calculation, or via a look-up table). For instance, the lookup table may be stored in a non-volatile manner inside a storage of the BECM 125 and/or a storage associated with other components of the vehicle 112. The average capacity $Q_{Avg}$ may be adjusted via an uncertainty component to determine the true capacity $Q_{True}$ of the traction battery 124. More specifically, the true capacity $Q_{True}$ of the traction battery 124 may be determined using the following equation:

$$Q_{True} = Q_{Avg} \pm \frac{U(Q_{New})}{\sqrt{N}} \quad (5)$$

wherein $U(Q_{New})$ denotes an uncertainty associated with the newly calculated instantaneous capacity $Q_{New}$ that is most recently estimated, and N denotes that sample size of the adaptive low-pass filter. The sample size N may be in integer defining a total number of instantaneous capacity data points including both the previously determined capacity $Q_{Old}$ and the newly calculated instantaneous capacity $Q_{New}$ to be taken into account for estimating the true capacity $Q_{True}$ of the traction battery 124. The BECM 125 may determine the weight W of the low-pass filter using the sample size N. The above equation (5) may be developed into:

$$N = \left(\frac{U(Q_{New})}{Q_{True} - Q_{Avg}}\right)^2 \quad (6)$$

Since the average uncertainty of the average capacity $U_{Avg}$ may be defined as the differences between the true capacity and the average capacity of the traction battery 124 (e.g., $Q_{True} - Q_{Avg}$), the above equation (6) may be further developed into:

$$N = \left(\frac{U(Q_{New})}{U_{Avg}}\right)^2 \quad (7)$$

The uncertainty of the average capacity $U_{Avg}$ may be a predetermined target or goal based on the design needs. For instance, an acceptable average capacity uncertainty $U_{Avg}$ may be set to within a range of 1%-5%. Additionally or alternatively, the average capacity uncertainty $U_{Avg}$ may vary depending on one or more factors such as the battery charging cycle, battery age of the like. For instance, the acceptable average capacity uncertainty $U_{Avg}$ may be small when the battery is new. As the battery becomes older and more charging cycles are accumulated, the acceptable average capacity uncertainty $U_{Avg}$ may increase.

Since the average uncertainty $U_{Avg}$ has become available or determined, the only parameter to determine the sample size N is the uncertainty associated with the newly calculated instantaneous capacity $U(Q_{New})$. The present disclosure proposes a method to determine the uncertainty associated with the most recently calculated new instantaneous capacity $U(Q_{New})$ based on an estimated state of charge (SOC) of the traction battery 124 and ampere-hour integration. More specifically, the estimated new instantaneous capacity uncertainty $U(Q_{New})$ may be determined by the following equation:

$$U(Q_{New}) = 100\% * \quad (8)$$

$$\sqrt{\left(\frac{U\left(\int_{CC_1}^{CC_2} I\,dt\right)}{\int_{CC_1}^{CC_2} I\,dt}\right)^2 + \left(\frac{\sqrt{(U(SOC_{LUT}(V(CC2), T(CC2))))^2 + (U(SOC_{LUT}(V(CC1), T(CC1))))^2}}{SOC_{LUT}(V(CC2), T(CC2)) - SOC_{LUT}(V(CC1), T(CC1))}\right)^2} * Q_{New}$$

wherein $$\int_{CC_1}^{CC_2} I\,dt$$

denotes the integration of current (e.g., net amp hour throughput) between a first instance when the main contactor 127 is closed and a subsequent second instance when the main contactor 127 is closed. Both the first and second instances may be time points before the current time. The time period between the first and second instances only includes the amount of time when the main contactor 127 is closed. As an example, a first instance may occur at 8 AM when the vehicle 112 is driven from a user's home to work for an hour. The vehicle may be parked for 8 hours, and then driven to home at 5 PM which takes another hour. The second instance may occur when the vehicle 112 is plugged in at home at 6 PM. In the above example, the total time is 2 hours (not including the 8 hours parking time).

$$U\left(\int_{CC_1}^{CC_2} I\,dt\right)$$

denotes the uncertainty associated with the net amp hour throughput measurement as calculated via the current integration. The traction battery 124 may be associated with a predetermined current sensor uncertainty $U_{Sensor}$ in the form of an amp-hour per hour error. For instance, if the current sensor has an uncertainty $U_{Sensor}$ of 3 Ah per hour, it means up to 3 Ah amount of uncertainty may be applicable after 1 hour of measurement. Therefore, the uncertainty associated with the net amp hour throughput measurement may be determined using the equation below:

$$U\left(\int_{CC_1}^{CC_2} I\,dt\right) = U_{Sensor} * \int_{CC_1}^{CC_2} t\,dt \quad (9)$$

In one example, the current sensor uncertainty $U_{Sensor}$ may be a constant. Alternatively, the current sensor uncertainty $U_{Sensor}$ may be a variable as a function of the current, or other factors as well.

$SOC_{LUT}(V(CC1), T(CC1))$ denotes the SOC of the traction battery 124 estimated via a SOC-OCV lookup table at the first instance. $SOC_{LUT}(V(CC2), T(CC2))$ denotes the SOC of the traction battery 124 estimated via the SOC-OCV lookup table at the second instance. The SOC-OCV lookup table may be stored in a non-volatile manner inside a storage of the BECM 125 and/or a storage associated with other components of the vehicle 112. Like most other lookup tables, the SOC-OCV lookup table may not be 100% accurate. Thus, the SOC-OCV lookup process may be inherently associated with an uncertainty. The above equation (8) takes the uncertainty into account by introducing $U(SOC_{LUT}(V(CC1), T(CC1)))$ which reflects the uncertainty associated with the SOC-OCV lookup process at the first instance, and $U(SOC_{LUT}(V(CC2), T(CC2)))$ which reflects the uncertainty associated with the SOC-OCV lookup process at the second instance. While some uncertainty comes from the SOC-OCV lookup table, uncertainties may be also due to voltage measurement error and an unrelaxed battery voltage.

The newly calculated instantaneous capacity $Q_{New}$ presented in the above equation (8) may be calculated using the following equation:

$$Q_{New} = \frac{100\% * \int_{CC_1}^{CC_2} I dt}{SOC_{LUT}(V(CC2), T(CC2)) - SOC_{LUT}(V(CC1), T(CC1))} \quad (10)$$

With all the required parameters determined, the sample size N of the adaptive low-pass filter may be estimated using the above equation (7). The BECM 125 may further determine the weight W of the low-pass filter and thus the true capacity of the traction battery 124 using equations (2) to (4).

Figure 2:
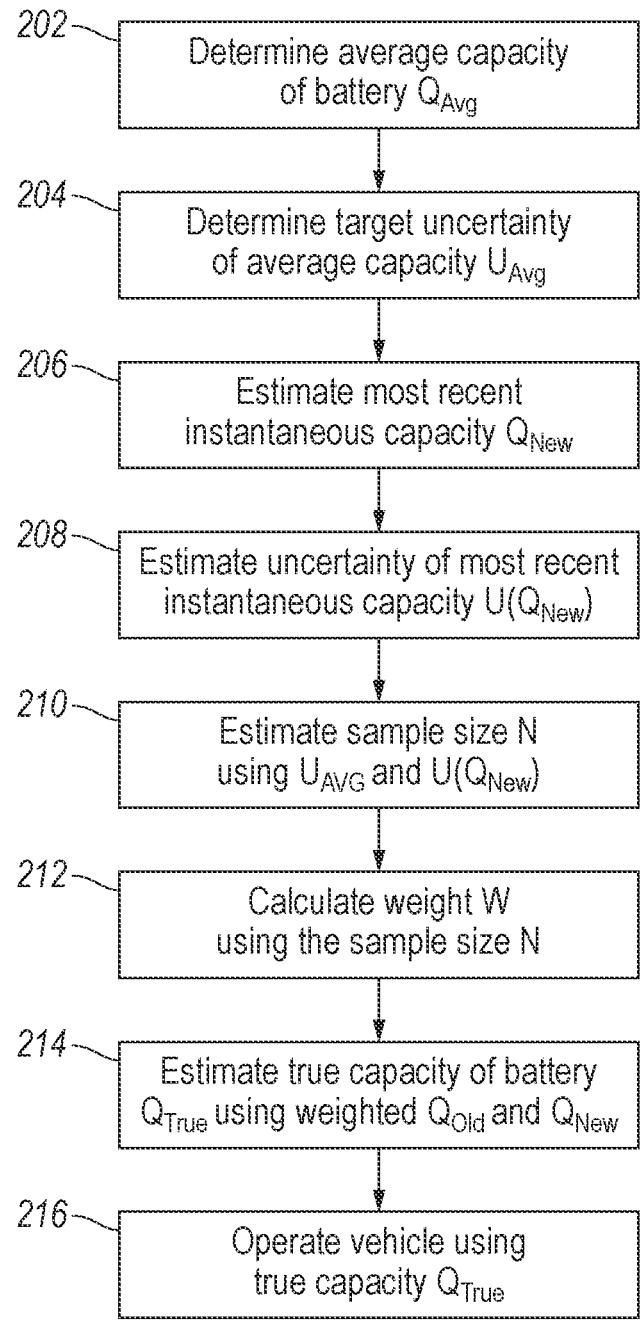
FIG. 2 illustrates an example flow diagram of a process operating the vehicle.

Referring to FIG. 2, an example process 200 for operating the vehicle is illustrated. With continuing reference to FIG. 1, the process 200 may be independently implemented via the BECM 125. Additionally or alternatively, the process 200 may be collectively implemented via the BECM 125, the system controller 150, and/or other components of the vehicle 112 under essentially the same concept. The following description will be made with reference to the BECM 125 for simplicity. At operation 202, the BECM 125 determines the average capacity $Q_{Avg}$ of the traction battery 124 based on one or more parameters. As discussed above, the average capacity $Q_{Avg}$ may be determined via a lookup table based on parameters such as the battery age and charging cycles. At operation 204, the BECM 125 determines a target average capacity uncertainty $U_{Avg}$. In one example, the target uncertainty may be determined based on the average capacity $Q_{Avg}$ that has been previously determined at operation 202. As the traction battery 124 ages and the charging cycle increases, the target uncertainty $U_{Avg}$ may increase. Alternatively, the target average capacity uncertainty $U_{Avg}$ may be independent from the average capacity $Q_{Avg}$ of the traction battery 124. Instead, the target average capacity uncertainty $U_{Avg}$ may be set by a user (or technician) and received by the vehicle 112 (e.g., via an interface).

At operation 206, the BECM 125 estimates the most recent instantaneous capacity $Q_{New}$ of the traction battery 124 using the above equation (8) based on the ampere-hour integration and the SOC of both the first instance and the second instance of prior main contactor closure. A lookup table may be used to determine the SOC using measured voltage and temperature at the corresponding instances as input. At operation 208, the BECM 125 estimates the uncertainty $U(Q_{New})$ associated with the most recent instantaneous capacity $Q_{New}$ using equation (8) discussed above.

At operation 210, the BECM 125 estimates the sample size N using the equation (7) discussed above based on both the average capacity uncertainty $U_{avg}$ and the uncertainty $U(Q_{New})$ associated with the most recent instantaneous capacity $Q_{New}$. With the appropriate sample size N estimated, at operation 212, the BECM 125 determines the weight (including the first weight W and the second weight 1−W) of the adaptive low-pass filter using equations (2) and (3).

At operation 214, the BECM 125 estimates the true capacity $Q_{True}$ of the traction battery using the weight W based on equation (4).

With the true capacity $Q_{True}$ determined, at operation 216, the BECM 125 operates the vehicle 112 and/or the traction battery 124 based on the true capacity $Q_{True}$. The operations performed by the BECM 125 may includes various examples. The BECM 125 may adjust the discharging of the traction battery 124 using the true capacity $Q_{True}$ when the vehicle 112 is driven. For instance, responsive to determining the true capacity $Q_{True}$ has been reduced since the last estimation, the BECM 125 may provide a shorter range estimate and reduce the maximum discharge power of the traction battery 124 to conserve electric energy. Alternatively, the BECM 125 may adjust the charging operations based on the true capacity $Q_{True}$. As an example, responsive to determining the true capacity $Q_{True}$ has been reduced, the BECM 125 may reduce the power and/or total amount of the battery charging via the EVSE 138 and/or re-generative charging.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a traction battery;
   an electric machine; and
   a controller programmed to alter a maximum discharge power of the traction battery according to an estimated capacity of the traction battery that depends on a previous instantaneous capacity value of the traction battery, a current instantaneous capacity value of the traction battery, and a weight parameter having a value that changes according to a charge experienced by the traction battery and a state of charge of the traction battery.

2. The vehicle of claim 1, wherein the value further changes according to the current instantaneous capacity value.

3. The vehicle of claim 1 further comprising a switch configured to electrically connect the traction battery and the electric machine, wherein the charge corresponds only to periods when the switch is closed.

4. The vehicle of claim 1, wherein the weight parameter corresponds to a sample size of a low pass filter.

5. The vehicle of claim 1, wherein the estimated capacity is a function of a product of the previous instantaneous capacity value and the weight parameter.

6. The vehicle of claim 5, wherein the estimated capacity is also a function of a product of the current instantaneous capacity value and a complement of the weight parameter.

7. A method comprising:
altering a maximum discharge power of a traction battery according to an estimated capacity of the traction battery that depends on a weight parameter having a value that changes according to a charge experienced by the traction battery during periods when a switch connects the traction battery with an electric machine.

8. The method of claim 7, wherein the estimated capacity further depends on a previous instantaneous capacity value of the traction battery and a current instantaneous capacity value of the traction battery.

9. The method of claim 8, wherein the estimated capacity is a function of a product of the previous instantaneous capacity value and the weight parameter, and the product of the current instantaneous capacity value and a complement of the weight parameter.

10. The method of claim 8, wherein the value further changes according to the current instantaneous capacity value.

11. The method of claim 7, wherein the weight parameter corresponds to a sample size of a low pass filter.

12. An automotive power system comprising:
a controller programmed to alter a maximum discharge power of a traction battery according to an estimated capacity of the traction battery that depends on a weight parameter having a value that changes according to a charge experienced by the traction battery during periods when a switch connects the traction battery with an electric machine.

13. The automotive power system of claim 12, wherein the estimated capacity further depends on a previous instantaneous capacity value of the traction battery and a current instantaneous capacity value of the traction battery.

14. The automotive power system of claim 13, wherein the estimated capacity is a function of a product of the previous instantaneous capacity value and the weight parameter.

15. The automotive power system of claim 14, wherein the estimated capacity is also a function of a product of the current instantaneous capacity value and a complement of the weight parameter.

16. The automotive power system of claim 13, wherein the value further changes according to the current instantaneous capacity value.

17. The automotive power system of claim 12, wherein the weight parameter corresponds to a sample size of a low pass filter.

* * * * *